United States Patent [19]

Stampa et al.

[11] Patent Number: 5,085,091
[45] Date of Patent: Feb. 4, 1992

[54] LOW FRICTION TRACTION DRIVE ASSEMBLY

[75] Inventors: Juergen P. Stampa, Costa Mesa; Ronald T. Honda, Irvine; James D. Hendry, Huntington Beach, all of Calif.

[73] Assignee: Loral Aerospace Corp., New York, N.Y.

[21] Appl. No.: 710,242

[22] Filed: Jun. 3, 1991

Related U.S. Application Data

[63] Continuation of Ser. No. 464,488, Jan. 12, 1990, abandoned.

[51] Int. Cl.$^5$ .............................................. F16H 13/02
[52] U.S. Cl. ...................... 74/206; 384/552; 384/553
[58] Field of Search ............... 74/204, 206; 384/551, 384/552, 553

[56] References Cited

U.S. PATENT DOCUMENTS

| | | | |
|---|---|---|---|
| 1,528,530 | 3/1925 | Coffee | 74/206 |
| 2,537,578 | 1/1951 | Foley | 384/553 |
| 2,975,668 | 7/1957 | Eckel | 350/6.4 |
| 3,083,611 | 1/1961 | Ziolkowski et al. | 250/229 |
| 3,226,721 | 12/1965 | Gould | 343/754 |
| 3,378,687 | 6/1968 | Schepler | 250/203.4 |
| 3,752,998 | 8/1973 | Stripling et al. | 250/234 |
| 4,009,393 | 2/1977 | Ashley, Jr. et al. | 250/339 |
| 4,010,365 | 3/1977 | Meyers et al. | 250/236 |
| 4,030,807 | 6/1977 | Briney | 350/6.9 |
| 4,039,246 | 8/1977 | Voigt | 350/6.9 |
| 4,061,415 | 12/1977 | Taenzer | 156/73.6 |
| 4,427,878 | 6/1984 | Buchtel et al. | 250/201.1 |
| 4,709,589 | 12/1987 | Kraus | 74/206 |
| 4,799,807 | 1/1989 | Kuroiwa | 384/553 |

FOREIGN PATENT DOCUMENTS

| | | | |
|---|---|---|---|
| 909105 | 4/1946 | France | 384/552 |
| 1432297 | 10/1988 | U.S.S.R. | 74/206 |

*Primary Examiner*—Leslie A. Braun
*Assistant Examiner*—Scott Anchell
*Attorney, Agent, or Firm*—Harry G. Weissenberger; Edward J. Radlo; Keith L. Zerschling

[57] ABSTRACT

Friction in a traction drive assembly having counter-rotating races interconnected by drive balls captured by a stationary retainer is substantially reduced, and the life of the assembly is substantially extended, by interposing rolling interface elements between the drive balls and the retainer. The interface elements may take the form of balls, pins or wheels, and separate lubricating means for them may be provided.

11 Claims, 4 Drawing Sheets

LOW FRICTION TRACTION DRIVE ASSEMBLY

LICENSE RIGHTS

This is a Subject Invention under U.S. Army (MICOM) Contract DAAH01-88-C-0570, which grants certain license rights to the United States Government.

This application is a continuation of application Ser. No. 464,488 filed Jan. 12, 1990, now abandoned, and also entitled "LOW FRICTION TRACTION DRIVE ASSEMBLY".

FIELD OF THE INVENTION

This invention relates to traction drive assemblies for optical scanners, and more particularly to an arrangement for substantially increasing their life by reducing friction.

BACKGROUND OF THE INVENTION

U.S. Pat. No. 4,427,878 to Buchtel et al. describes an optical scanning apparatus for a gyroscopic missile seeker. FIG. 2 of that patent shows the counter-rotating traction drive for the optics of that apparatus. In that drive, balls driven by an outer race rotate in a fixed keeper or retainer having arcreate separator portions so as to drive an inner race in the opposite direction and at a higher speed.

In practice, the parts involved in a traction drive assembly of this type are very small; the entire assembly is typically less than 1 cm in diameter. Although the retainer is made of porous, lubricant-impregnated bronze, the forces generated at the rotational speeds and loads involved are great enough to rapidly wear and smear the bronze surface of the retainer where the drive balls rub against it. As a result, the retainer becomes incapable of providing sufficient lubrication at the contact surface, and thereby appreciably shortening the life of the assembly.

DESCRIPTION OF THE INVENTION

This invention greatly increases the life of the traction drive assembly of U.S. Pat. No. 4,427,878 by providing, in conjunction with each ball, a rotational interface element interposed between the drive ball and the retainer in rolling engagement with the drive ball on the thrust side of the drive ball. The interface element may be a small ball, pin or wheel captured in the retainer in such a way as to receive ample lubrication. Also, the small rotational interface element has a much lower frictional resistance moment than the powering moment available at the drive ball, and it is less critical with respect to dimensional tolerances and contamination.

DESCRIPTION OF THE PREFERRED EMBODIMENT

Figure 1B:
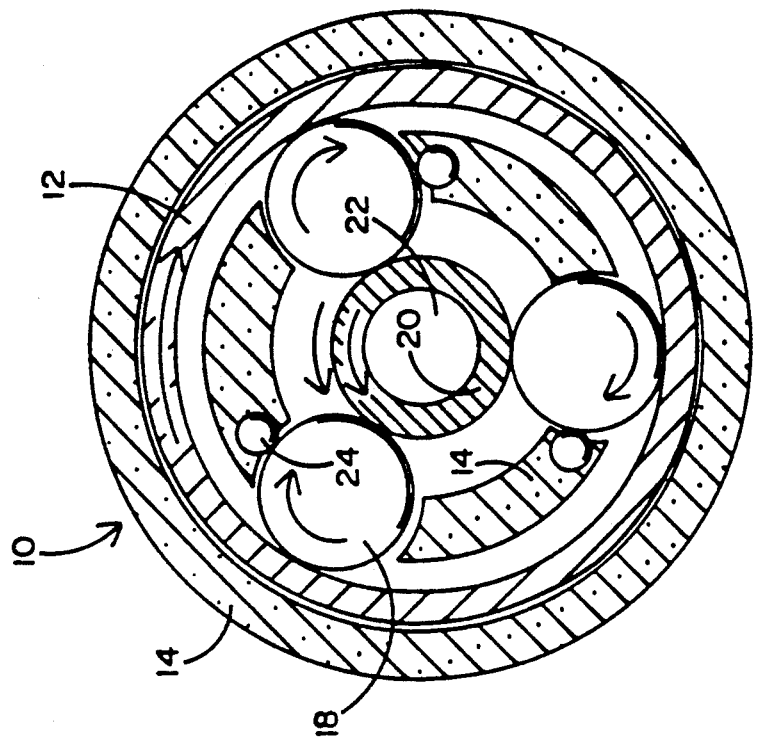
FIGS. 1a and 1b are vertical sections of a traction drive assembly constructed in accordance with the invention.
Figure 1A:
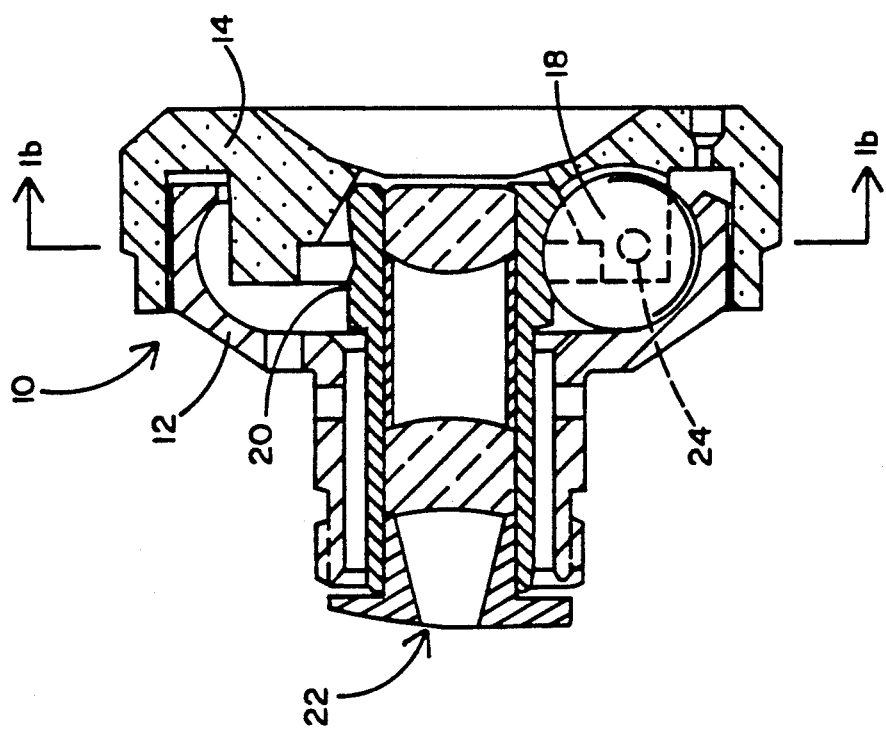

The improved traction drive assembly of this invention is generally shown at 10 in FIGS. 1a and 1b. In accordance with the teachings of U.S. Pat. No. 4,427,878, the outer race 12 is caused to revolve about the stationary retainer 14. This rotation is transmitted and inverted by the captive drive balls 18 so as to drive the inner race 20 at a higher speed and in the opposite direction from the rotation of outer race 12. The optics 22 which are driven by the traction drive assembly 10 are mounted on the inner race 20.

The retainer 14 is conventionally fabricated from lubricant-impregnated porous bronze, or from a plastic material with similar properties, to minimize the friction between the drive balls 18 and the retainer 14. However, due to the small size of the parts involved, the pores of the bronze retainer 14 soon plug up in use in the prior art structure of U.S. Pat. No. 4,427,878, and friction increases exponentially until the drive fails.

To overcome this problem and extend the life of the drive 10 while at the same time reducing the amount of power needed to drive it, the present invention provides a rotating interface between the drive balls 18 and the retainer 14. This interface may take the form of small balls 24 (FIGS. 1b, 2 and 3), pins 26 (FIGS. 4a and 4b), or wheels 28 (FIGS. 5a and 5b).

Figure 2:
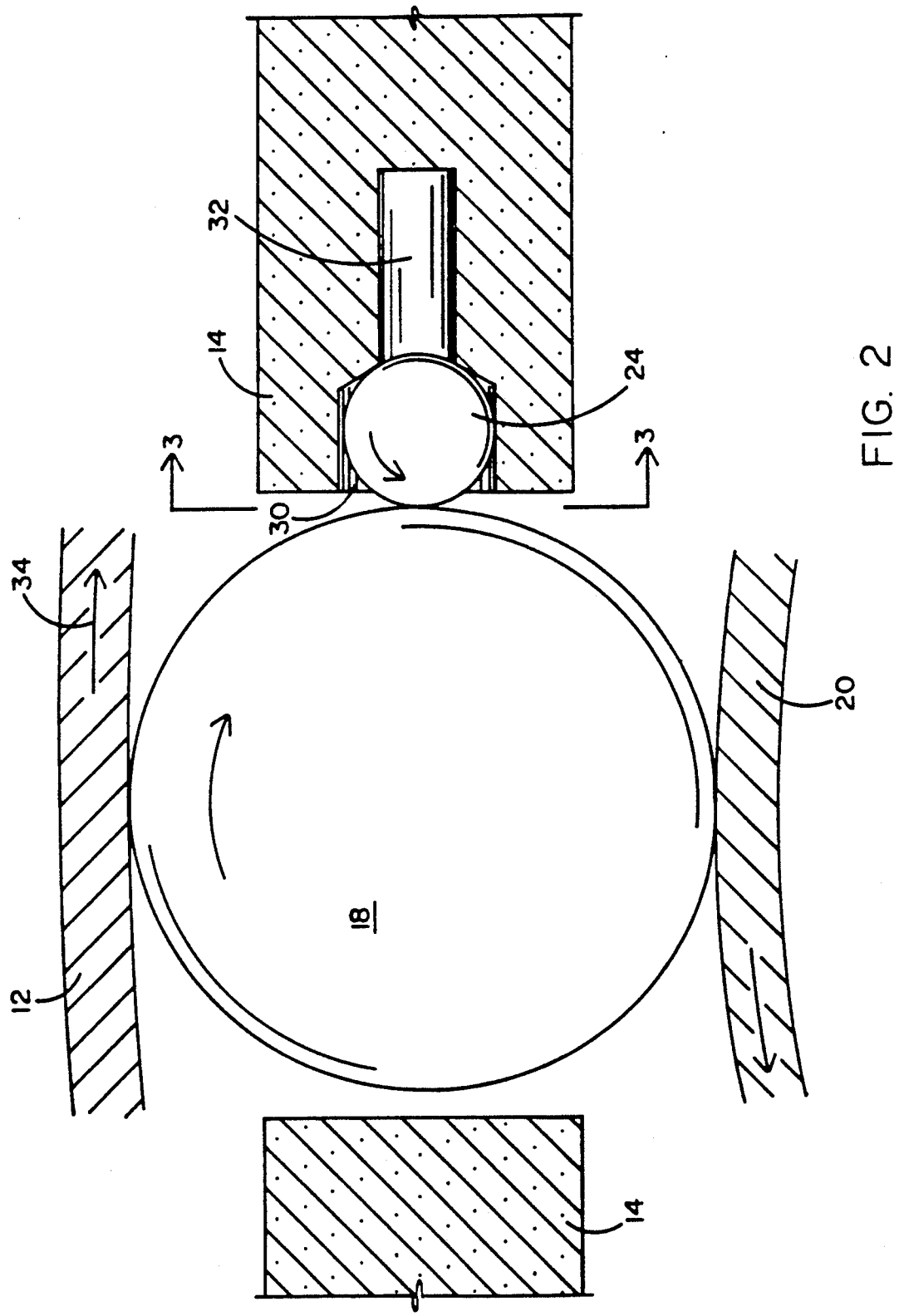
FIG. 2 is a detail view of a portion of FIG. 1b.
Figure 3:
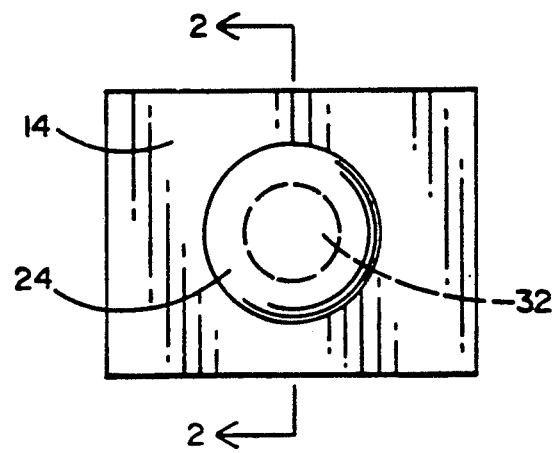
FIG. 3 is a section along line 3—3 of FIG. 2.

FIG. 2 illustrates the principles involved in the operation of the invention. In this embodiment, a small interface ball 24 is captured in a pocket 30 of the retainer 14. A lubricant-filled recess 32 is formed in the retainer 14 behind the pocket 30. As the outer race 12 rotates in the direction of arrow 34, the drive ball 18 is pushed against the interface ball 24 and causes it to rotate in the pocket 30. Because of the mechanical advantage involved, it takes less power, at a given constant speed, to overcome the friction between interface ball 24 and retainer 14 than it would take to overcome direct sliding friction between drive ball 18 and retainer 14. In addition, the lubricant reservoir 32, combined with the optional lubricant-impregnated porous material of retainer 14, provides a generous supply of lubricant to maintain a lubricant film on the surface of interface ball 24.

Figure 4B:
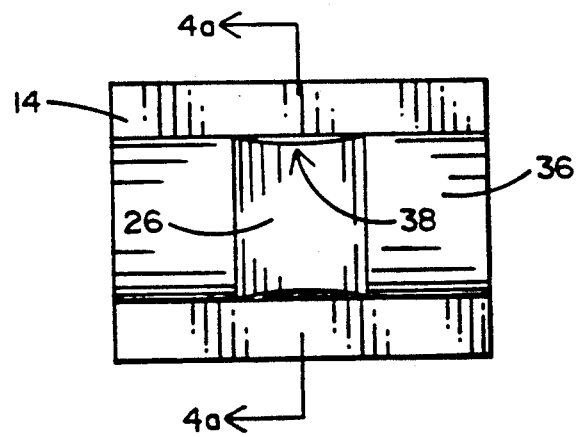
FIGS. 4a and 4b are sections similar to FIGS. 2 and 3 but showing an alternative embodiment of the invention.
Figure 4A:
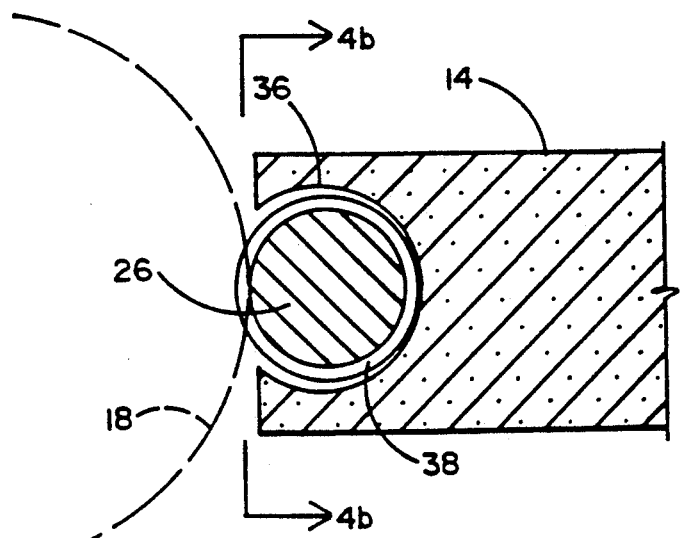

In the alternative embodiment of FIGS. 4a and 4b, a pin 26 is inserted into an open passage 36 formed transversely in retainer 14. The pin 26 has a concave surface or ball race 38 matching the convexity of drive ball 18. This causes drive ball 18 to hold the pin 26 in a centered position in passage 36.

Figure 5B:
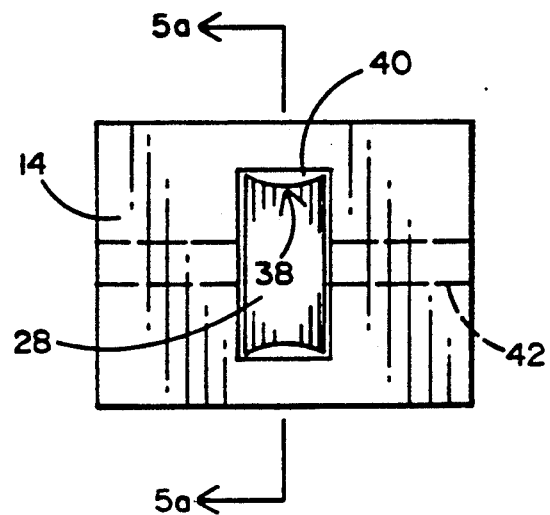
FIGS. 5a and 5b are sections similar to FIGS. 2 and 3 but showing a second alternative embodiment of the invention.
Figure 5A:
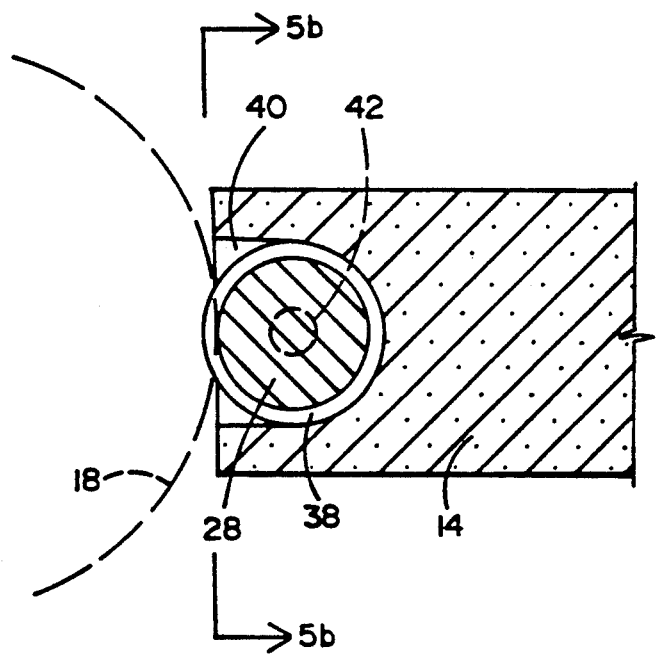

The alternative embodiment of FIGS. 5a and 5b uses a wheel 28 as the interface element. The wheel 28 is trapped in a slot 40 milled in the retainer 14. Like the pin 26, the wheel 28 may have a concave surface or ball race 38 matching the convexity of drive ball 18. Lubricant is supplied to wheel 28 through passages 42 formed in the retainer 14.

It will be understood that other forms of rotatable interface elements may be used within the scope of the invention, the objective of the invention being simply to replace the sliding interface between drive ball 18 and retainer 14 with a rolling one.

We claim:

1. A traction drive assembly for a scanning mirror, comprising:

a) a stationary annular retainer having arcuate separator portions, said separator portions having faces of lubricous material;

b) an outer race adapted to be rotated in a first direction with respect to said retainer;
c) an inner race coaxial with said outer race and said retainer, arcs of said arcuate separator portions lying in a plane generally including said races;
d) a plurality of drive balls interposed between said outer race and inner race so as to rotate said inner race in a direction opposite to that of said outer race, said drive balls being captured between said arcuate separator portions to prevent movement of said drive balls about the axis of said races and retainer, and being operationally biased into frictional engagement with said faces; and
e) rotatable interface elements captured within said faces for rotation therein, said elements being interposed between said drive balls and said retainer to provide a low-friction contact between said drive balls and said faces.

2. The assembly of claim 1, in which said interface elements are interface balls of substantially smaller diameter than said drive balls.

3. The assembly of claim 2, in which said interface balls are captured by said drive balls in pockets formed in said faces.

4. The assembly of claim 1, in which said interface elements are pins.

5. The assembly of claim 4, in which said pins have a concave rolling surface forming a ball race for engaging said drive balls.

6. The assembly of claim 1, in which said interface elements are wheels.

7. The assembly of claim 6, in which said wheels have a concave rolling surface forming a ball race for engaging said drive balls.

8. The assembly of claim 6, in which said wheels are captured by said drive balls in slots formed in said faces.

9. The assembly of claim 1, further including lubricant supply means for supplying lubricant to said interface elements.

10. The assembly of claim 9, in which said lubricant supply means include lubricant reservoirs formed in said retainer.

11. The assembly of claim 1, in which said lubricous material is lubricant-impregnated bronze.

* * * * *